(12) United States Patent
Barnett et al.

(10) Patent No.: US 11,061,304 B2
(45) Date of Patent: Jul. 13, 2021

(54) REAR-PROJECTED ANIMATED DISPLAY DEVICE

(71) Applicant: SmartDeco LLC, San Francisco, CA (US)

(72) Inventors: Theodore Hayes Barnett, San Francisco, CA (US); Keith Kirby, Hermosa Beach, CA (US)

(73) Assignee: SmartDeco LLC, San Francisco, CA (US)

( * ) Notice: Subject to any disclaimer, the term of this patent is extended or adjusted under 35 U.S.C. 154(b) by 0 days.

(21) Appl. No.: 15/944,091

(22) Filed: Apr. 3, 2018

(65) Prior Publication Data

US 2018/0284587 A1 Oct. 4, 2018

Related U.S. Application Data

(60) Provisional application No. 62/480,665, filed on Apr. 3, 2017.

(51) Int. Cl.
*G03B 21/14* (2006.01)
*G03B 21/10* (2006.01)
*G03B 21/28* (2006.01)
*G03B 21/60* (2014.01)
*H04N 9/31* (2006.01)
(Continued)

(52) U.S. Cl.
CPC ............ *G03B 21/10* (2013.01); *G03B 21/28* (2013.01); *G03B 21/60* (2013.01); *H04N 9/3194* (2013.01); *G02B 13/24* (2013.01); *G02B 27/0955* (2013.01); *H04N 5/74* (2013.01)

(58) Field of Classification Search
CPC ........ G03B 21/10; G03B 21/28; G03B 21/22; G03B 21/14
See application file for complete search history.

(56) References Cited

U.S. PATENT DOCUMENTS 2,158,906 A * 5/1939 Netter .................... G09B 23/30
434/273
3,973,840 A * 8/1976 Jacobs ................... G03B 21/00
352/86

(Continued)

FOREIGN PATENT DOCUMENTS

CN 203220165 10/2013
CN 204260386 4/2015

OTHER PUBLICATIONS

AtmosFX, "What Are Digital Decorations?", https://atmosfx.com, retrieved Jun. 18, 2018, pp. 1-3.

(Continued)

*Primary Examiner* — Bao-Luan Q Le
(74) *Attorney, Agent, or Firm* — Raubvogel Law Office

(57) ABSTRACT

A system may include an enclosure with an exterior wall that defines a cavity therein. The exterior wall may have an interior surface and an exterior surface. A projector support may be insertable into the cavity or may be formed as a single piece with the exterior wall such that the projector support supports a projector in a position and orientation in which the projector projects light at the interior surface from within the cavity. The exterior wall may have a thickness and material composition selected such that, in response to projection of light at the interior surface, an image is visible on the exterior surface.

47 Claims, 3 Drawing Sheets

(51) Int. Cl.
  *H04N 5/74* (2006.01)
  *G02B 27/09* (2006.01)
  *G02B 13/24* (2006.01)

(56) References Cited

U.S. PATENT DOCUMENTS

| | | | | |
|---|---|---|---|---|
| 4,104,625 | A * | 8/1978 | Bristow | A61B 5/1176 340/318 |
| 4,646,920 | A | 3/1987 | Kruger | |
| 4,978,216 | A * | 12/1990 | Liljegren | G09F 19/08 353/28 |
| 5,923,469 | A * | 7/1999 | Machtig | G03B 21/62 359/451 |
| 6,059,412 | A * | 5/2000 | Sugita | G03B 21/10 348/E5.138 |
| 6,467,908 | B1 * | 10/2002 | Mines | G09F 19/08 353/28 |
| 6,616,283 | B1 * | 9/2003 | Takano | G03B 21/22 353/101 |
| 6,719,432 | B2 * | 4/2004 | Chen | G03B 21/22 348/744 |
| 6,773,115 | B2 * | 8/2004 | Tseng | G03B 21/10 353/78 |
| 7,055,960 | B2 * | 6/2006 | Chang | G03B 21/10 348/745 |
| 7,066,610 | B2 * | 6/2006 | Yamada | G03B 21/22 348/789 |
| 7,072,002 | B2 * | 7/2006 | Liao | G03B 21/14 348/787 |
| 7,134,756 | B2 * | 11/2006 | Drucker | G03B 21/28 353/77 |
| 7,163,297 | B2 * | 1/2007 | Suzuki | G03B 21/10 353/77 |
| 7,237,908 | B2 * | 7/2007 | Suzuki | G03B 21/10 353/77 |
| 7,458,697 | B2 * | 12/2008 | Ueda | H04N 9/3141 348/E5.143 |
| 7,581,839 | B1 | 9/2009 | Wang et al. | |
| 7,627,478 | B2 | 12/2009 | Cosatto et al. | |
| 7,896,504 | B2 * | 3/2011 | Sacre | G03B 21/10 353/51 |
| 7,988,849 | B2 * | 8/2011 | Biewer | A61M 1/28 210/138 |
| 8,033,669 | B2 * | 10/2011 | Endo | G03B 21/10 353/119 |
| 8,038,304 | B2 | 10/2011 | Mizuuchi et al. | |
| 8,061,851 | B2 * | 11/2011 | Kawai | G03B 21/10 353/61 |
| 8,118,434 | B2 | 2/2012 | Turner et al. | |
| D660,049 | S | 5/2012 | Tseng | |
| 8,256,904 | B2 * | 9/2012 | Reichow | G03B 21/10 352/10 |
| 8,517,543 | B2 * | 8/2013 | Reichow | G03B 21/10 221/10 |
| 8,562,145 | B2 | 10/2013 | Roberts et al. | |
| 8,721,093 | B2 | 5/2014 | Hsiung | |
| 8,919,969 | B2 | 12/2014 | Biernath et al. | |
| 9,083,931 | B1 * | 7/2015 | Helms | H04N 5/74 |
| 9,750,294 | B2 * | 9/2017 | Sum | A41G 1/003 |
| 9,810,975 | B2 * | 11/2017 | Mahoor | G03B 21/10 |
| 10,126,636 | B1 * | 11/2018 | Heppler | G03B 21/10 |
| 10,321,107 | B2 * | 6/2019 | Fuchs | G03B 21/2053 |
| 2003/0128340 | A1 * | 7/2003 | Hsu | G03B 21/16 353/52 |
| 2003/0133083 | A1 * | 7/2003 | Chen | G03B 21/22 353/74 |
| 2003/0189694 | A1 * | 10/2003 | Yamada | G03B 21/10 353/77 |
| 2004/0027498 | A1 * | 2/2004 | Huber | G03B 21/10 348/787 |
| 2004/0119952 | A1 * | 6/2004 | Chen | G03B 21/001 353/119 |
| 2004/0130686 | A1 * | 7/2004 | Tseng | G03B 21/10 353/122 |
| 2004/0239897 | A1 * | 12/2004 | Ogawa | G03B 21/2066 353/119 |
| 2004/0252284 | A1 * | 12/2004 | Suzuki | G03B 21/10 353/77 |
| 2005/0001939 | A1 * | 1/2005 | Liao | G03B 21/14 348/787 |
| 2005/0110957 | A1 * | 5/2005 | Yamada | G03B 21/22 353/77 |
| 2005/0248729 | A1 * | 11/2005 | Drucker | G03B 21/28 353/71 |
| 2006/0007405 | A1 * | 1/2006 | Chen | G03B 21/10 353/70 |
| 2006/0044532 | A1 * | 3/2006 | Black, Jr. | G03B 21/001 353/122 |
| 2006/0082906 | A1 * | 4/2006 | Wang | G03B 21/14 359/798 |
| 2006/0139577 | A1 * | 6/2006 | Ikeda | G03B 21/10 353/74 |
| 2006/0268239 | A1 * | 11/2006 | Nasu | G03B 21/18 353/57 |
| 2007/0070298 | A1 * | 3/2007 | Hara | G03B 21/18 353/57 |
| 2007/0216877 | A1 * | 9/2007 | Sacre | G03B 21/10 353/97 |
| 2007/0217203 | A1 * | 9/2007 | Ueda | H04N 9/3141 362/294 |
| 2007/0229949 | A1 * | 10/2007 | Suko | G03B 21/10 359/443 |
| 2008/0088803 | A1 * | 4/2008 | Kawai | G03B 21/10 353/61 |
| 2008/0180643 | A1 * | 7/2008 | Endo | G03B 21/10 353/38 |
| 2008/0252861 | A1 * | 10/2008 | Niikura | G03B 21/10 353/77 |
| 2009/0051887 | A1 * | 2/2009 | Chen | G03B 21/145 353/119 |
| 2009/0292614 | A1 * | 11/2009 | Reichow | G03B 21/10 705/14.72 |
| 2010/0127965 | A1 | 5/2010 | Park | |
| 2012/0285978 | A1 * | 11/2012 | Reichow | G03B 21/10 221/1 |
| 2016/0047536 | A1 | 2/2016 | Lien et al. | |
| 2016/0078791 | A1 * | 3/2016 | Helms | G09F 27/00 348/565 |
| 2016/0097969 | A1 * | 4/2016 | Sum | A41G 1/003 353/15 |
| 2016/0198552 | A1 * | 7/2016 | Chen | H05B 47/19 348/460 |
| 2016/0219257 | A1 * | 7/2016 | Metter | G06F 3/017 |
| 2016/0231645 | A1 * | 8/2016 | Mahoor | G03B 21/10 |

OTHER PUBLICATIONS

Hallmark Animated pumpkin: https://www.amazon.com/gp/product/B00E0Q1P18/ref=as_li_ss_tl?ie=UTF8&camp=1789&creative=390957&creativeASIN=B00E0Q1P18&linkCode=as2&tag=halloweeneveryday-20, retrieved Jun. 18, 2018, pp. 1-4.

YouTube video of animated pumpkin: https://www.youtube.com/watch?v=KYPy-SG68I8&feature=youtu.be, Jun. 2018.

* cited by examiner

REAR-PROJECTED ANIMATED DISPLAY DEVICE

CROSS-REFERENCE TO RELATED APPLICATIONS

The present application claims the benefit of U.S. Provisional Application Ser. No. 62/480,665 for "REAR-PROJECTED ANIMATED DISPLAY DEVICE", filed on Apr. 3, 2017, the disclosure of which is incorporated herein by reference in its entirety.

TECHNICAL FIELD

The present document relates to systems and methods for projecting imagery onto objects.

BACKGROUND

There are many situations in which decorative objects are used. For example, at holidays or special events, decorations may be used to celebrate an occasion. In some instances, motors or other devices are used to animate the objects. Such techniques have many limitations, particularly in terms of cost and complexity.

SUMMARY

The present document describes systems and methods that can be used to project imagery onto the surface of an enclosure so that the imagery is visible from the enclosure's exterior. According to various embodiments, the enclosure (made, for example, of plastic) encases a projector (such as an LED projector), mirror, and speaker. Using the mirror, the projector projects an animation onto the interior surface of the enclosure, while (optionally) audio plays via the speaker. The enclosure can be constructed of a semi-transparent or translucent material that allows the projected animated image to be viewed from the exterior. A storage device, such as an SD card and reader, can be included within the enclosure to store the animated image data for the animated image to be projected; additionally or alternatively, a communications device can be included that receives the animated image data from a source, for example via wired or wireless communication. The animated image data can be streamed as it is transmitted, or stored on a local storage device in the enclosure and then played after being stored.

Updates and changes to the animated image can be made by, for example, replacing the storage device (such as the SD card) or by transmitting new animated images directly to the device (such as via a smartphone application and via direct connections to the internet over Wi-Fi). Such a system can be used to display any type of animation, such as for example a moving image of a talking and singing face. The animation can be preset, interactive (so that it responds to environmental stimuli), or a combination of the two.

According to one embodiment, a system may include an enclosure with an exterior wall defining a cavity therein, the exterior wall having an interior surface and an exterior surface, and a projector support that is insertable into the cavity or formed as a single piece with the exterior wall such that the projector support supports a projector in a position and orientation in which the projector projects light at the interior surface from within the cavity. The exterior wall may have a thickness and material composition selected such that, in response to projection of light at the interior surface, an image is visible on the exterior surface.

In the position and orientation, the projector may project the light at the interior surface along an optical pathway. The system may further have an optical element positioned in the optical pathway.

The optical element may be, for example, a mirror that reflects the optical pathway to the interior surface.

The optical element may be, for example, a lens configured and positioned to focus the light on the interior surface.

At least part of the interior surface may have a concave shape.

The system may further include the projector.

The system may further include a remote control configured to control operation of the projector by transmitting signals to the projector through the exterior wall.

The system may further include a sensor configured to detect at least one condition selected from the group consisting of presence of a user, motion of the user, and sound made by the user. The sensor may be operatively connectable to the projector to activate, deactivate, and/or modify display of the image on the exterior surface in response to detection of the condition.

The system may further include a computing device operatively connectable to the projector to control display of the image on the exterior surface.

The system may further include a speaker operatively connectable to the projector to produce sound during display of the image on the exterior surface.

The system may further include a non-transitory computer-readable medium with computer code stored thereon, that when executed by a processor of a computing device operatively connected to the projector, controls display of the image on the exterior surface.

The computer code may further be configured, when executed by a processor, to control display of the image by generating image data and initiating transmission of the image data to the projector.

The computer code may further be configured, when executed by a processor, to control display of the image by causing an input device to receive user input from a user, in response to receipt of the user input, generating animated image data, and initiating transmission of the animated image data to the projector to cause the projector to display an animated image.

The computer code may further be configured, when executed by a processor, to control display of the image by causing a sensor to generate sensor data based on detection at least one condition selected from the group consisting of presence of a user, motion of the user, and sound made by the user, in response to receipt of the sensor data, generating animated image data, and initiating transmission of the animated image data to the projector to cause the projector to display an animated image.

The computer code may further be configured, when executed by a processor, to generate audio data, and initiate transmission of the audio data to one of the projector and a speaker separate from the projector.

According to one embodiment, a method for generating an image on an exterior surface of an exterior wall of an enclosure, the enclosure defining a cavity therein, may include positioning a projector on a projector support within the cavity, and, with the projector positioned within the cavity, projecting light at an interior surface of the exterior wall such that, in response to projection of light at the interior surface, the image is visible on the exterior surface.

An optical element may be positioned within the enclosure, in an optical pathway. Projecting the light at the interior surface may include projecting the light along the optical pathway.

The method may further include generating image data, and initiating transmission of the image data to the projector. Projecting the light at the interior surface may include projecting a projection image based on the image data.

The method may further include, at an input device or a sensor, receiving an element selected from the group consisting of user input and sensor data, in response to receipt of the element, generating animated image data, initiating transmission of the animated image data to the projector, and projecting an animated projection image, based on the animated image data, at the interior surface such that, in response to projection of the animated projection image at the interior surface, an animated image is visible on the exterior surface.

According to one embodiment, an enclosure may include an exterior wall defining a cavity therein, the exterior wall having an interior surface and an exterior surface, a projector support positioned within the cavity such that the projector support supports a projector in a position and orientation in which the projector projects light along an optical pathway at the interior surface from within the cavity, and an optical element positioned within the cavity, along the optical pathway. The optical element may be selected from the group consisting of mirrors, lenses, and prisms. The exterior wall may have a thickness and material composition selected such that, in response to projection of light at the interior surface, an image is visible on the exterior surface.

BRIEF DESCRIPTION OF THE DRAWINGS

The accompanying drawings illustrate several embodiments. Together with the description, they serve to explain the principles of the embodiments. One skilled in the art will recognize that the particular embodiments illustrated in the drawings are merely exemplary, and are not intended to limit scope.

DETAILED DESCRIPTION

Figure 1:
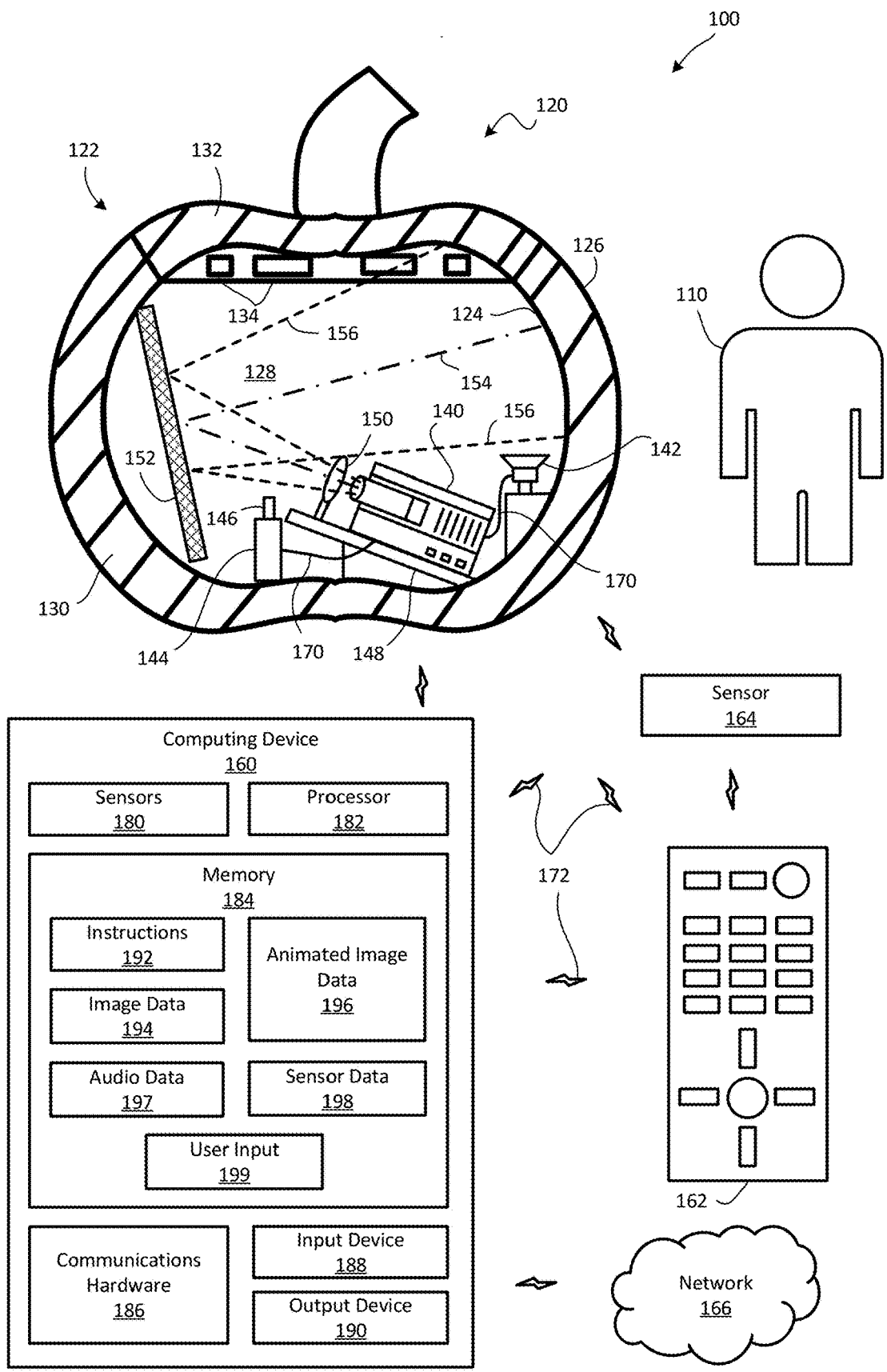
FIG. 1 is a front elevation, partial section view of a system according to one embodiment.

According to various embodiments, a projection system is implemented as an entertainment product that provides life-like and/or interactive displays of animation, such as for example in a holiday context for Halloween, Christmas, and/or the like. For example, it can be used to project animated images on an interior surface of a molded plastic enclosure such as a hollow plastic pumpkin-shaped enclosure, with a singing and/or talking jack-o-lantern face. The projector and/or accessories, such as a speaker and/or a storage device, may be situated within the plastic enclosure. The animated images can be updateable by the user, allowing for a wide variety of animated images, songs, and the like, which can be customized for individual users.

In at least one embodiment, the described device projects customizable animated images onto the interior surface of an enclosure in the form of a decorative plastic figure. An internal storage device (such as an SD card) and/or communications device (such as Bluetooth or Wi-Fi receiver) stores and/or receives audio and/or images, such as static and/or animated images. Animated images can be received from a computing device such as a smartphone or other device, and/or from the Internet. In at least one embodiment, a user can purchase and/or download animated images via a computer or smartphone, for playback on the device.

A projector displays an animated image, such as a face that is singing in sync with music in the audio track. In at least one embodiment, the device inside the enclosure can connect with and communicate with other devices, such as a computing device such as a smartphone, via wired or wireless communication. In this way, the device can be made to play static images, animated images, music, and/or audio as directed by the consumer operating the computing device. In at least one embodiment, a remote control can be provided, to allow a user to select among a number of different images, and/or to control the device in other ways (e.g. to change volume, download additional images, power on/off, and/or the like). Alternatively, such control can be provided via an app running on the computing device.

In at least one embodiment, the device is self-contained; the projector and other components are situated inside the enclosure so that no external projector is required. A power supply (such as a battery) can be included within the enclosure; alternatively, a power cord can be provided that allows the device to be powered from an external source.

In at least one embodiment, a custom lens is employed to enable the short-throw projection of images onto the interior surface. In at least one embodiment, the interior surface may be concave and/or irregular, for example if the enclosure represents a pumpkin. In at least one embodiment, 3D-printed shape-specific lenses and/or mirrors can be used, to enable image focus on an uneven interior surface of the enclosure (e.g. pumpkin ridges, face (nose, eye sockets), and/or the like).

In at least one embodiment, the enclosure is made of plastic that allows infrared ("IR") signals to pass through the device so that a remote control and/or one or more other wirelessly-connected devices can be used to change the images. Vents can be providing on the enclosure to enable sound to emanate from the device.

In various embodiments, the enclosure can be molded into any of a number of unique shapes (such as pumpkin, snowman, face, jewelry mannequin, and the like). Corresponding images for such themed enclosures can be offered.

In at least one embodiment, the system can also include a sensor that detects motion, heat, and/or other conditions to enable the system to react to external events (such as a person walking by) and cause the animated image to change accordingly. In at least one embodiment, an artificial intelligence component can be included, to allow the animated image to speak or interact in real-time, with content that adapts and reacts to environmental stimuli. In yet another embodiment, the animated image can be controlled in real-time by a user.

In yet another embodiment, image and/or sound content can be user-customizable. For example, a user can use a web-based application to design greetings, songs, and/or the like, with custom components, such as names for a child's birthday.

Exemplary Projection System

Referring to FIG. 1, a front elevation, partial section view depicts a system 100 according to one embodiment. The system 100 may provide entertainment for a user 110. The system 100 may be used to project imagery onto an object such as an enclosure 120, which may be a seasonal and/or decorative item such as a pumpkin, globe, snowman, or the like, or which may represent a face or body, or which may be of any other type. In the example of FIG. 1, the enclosure 120 is a pumpkin.

The enclosure 120 may have an exterior wall 122 that defines a cavity 128 in the interior of the enclosure 120. The exterior wall 122 may have an interior surface 124 and an exterior surface 126 that faces outward. The interior surface 124 may define the boundaries of the cavity 128, within which one or more components of the system 100 may reside. The exterior wall 122 may have a material composition and thickness suggested such that imagery projected on the interior surface 124 is visible (in reverse) as an image, such as a static image or an animated image, on the exterior surface 126. Thus, the imagery projected on the exterior wall 122 may be visible to the user 110.

In some embodiments, the exterior wall 122 may be translucent, and may be formed of a material such as a plastic. The exterior wall 122 may be colored plastic such that the imagery projected on it appears tinted with the color of the plastic used. The exterior wall 122 may be formed through the use of any known manufacturing methods, including but not limited to injection molding and blow molding.

The exterior wall 122 may also be divided into separate portions that can be disassembled from each other to facilitate access to the cavity 128. For example, the exterior wall 122 may have a base 130 and a lid 132, which may be removed from the base 130 to expose the cavity 128. Vents 134 may be formed in the exterior wall 122 to release heat generated from the components within the cavity 128, as well as to release sound generated from within the cavity 128 such that it is audible to the user 110. In the embodiment of FIG. 1, the vents 134 are on the lid 132, but they may be positioned elsewhere, such as on the base 130, if desired.

The system 100 may include components within the cavity 128 that provide audio and/or projected imagery for the user 110. In some embodiments, the system 100 may include a projector 140, a speaker 142, and a storage device 144. The storage device 144 may receive a storage medium 146 on which image data and/or animated image data are stored.

The projector 140 may be sufficiently small to fit within the cavity 128. The projector 140 may, for example, be a portable LED projector, and may be powered via an AC adapter (not shown), or via one or more internal or external batteries. The projector 140 may be a short-throw projector designed to project imagery onto a surface relatively close to the projector 140. In the alternative, the projector 140 may be a standard or long-throw projector, and its projection range may be modified through the use of additional optical elements, as will be shown and described subsequently. The projector 140 may be specially designed to work in conjunction with the enclosure 120, or may be an off-the-shelf projector of any type known in the art.

The speaker 142 may be of any known type that produces the desired type of audio. Many different types of audio may be produced, such as music, dialogue (for example, spoken by a face that appears on the exterior surface 126 of the enclosure 120), sound effects, and/or the like. Sound produced by the speaker 142 may pass through the exterior wall 122 and/or through the vents 134, to be heard by the user 110. In some embodiments, the interior surface 124 may function in concert with the exterior wall 122 to produce sound in a manner similar to that of a ported speaker, such as subwoofer, with an interior chamber in which sound resonates prior to being released through the port(s).

The storage device 144 may store image data and/or animated image data in a wide variety of ways. In some embodiments, the storage device 144 may be a magnetic hard drive, optical storage device, or flash memory device. The storage device 144 may store data directly, or via a storage medium 146 that is removable from the storage device 144. In some exemplary embodiments, the storage device 144 may be a DVD player, universal serial bus (USB) socket that receives a USB drive, a secure digital (SD) card reader, a micro-SD card reader, and/or the like. In the examples set forth above, the storage medium 146 may be a DVD, a USB drive, an SD card, or a micro-SD card.

Notably, the speaker 142 and the storage device 144 are optional. In some embodiments, sound may not be provided. In some embodiments, image data and/or animated image data may not be stored within the cavity 128 of the enclosure 120, but may instead be stored external to the enclosure 120, and transmitted to the projector 140 through the use of wired and/or wireless transmission.

The projector 140 may be supported in its desired position within the cavity 128 by a projector support 148. The projector support 148 may be formed as a single piece with the exterior wall 122 (for example, via injection molding or blow molding), or may be formed separately and inserted into the cavity 128 of the enclosure 120. The projector support 148 may maintain the projector 140 at a position and orientation at which the projector 140 projects light at the interior surface 124 interior to the exterior surface 126 on which the image and/or animated image is to be viewed by the user 110.

The projector 140 may rest on top of the projector support 148 as shown in FIG. 1. Alternatively, the projector support 148 may be secured above, below, or beside the projector support 148. Securing the projector 140 to the projector support 148 may be particularly desirable where the projector 140 is to be positioned toward the top of the exterior wall 122, above or beside the intended location of the projector 140.

As mentioned above, one or more optical elements may optionally be used to modify the manner in which light is projected from the projector 140. An "optical element" is any device that receives light and emits the light, with some modification in the emitted light. For example, an optical element may modify the wavelength of the light, the intensity of the light, and/or the direction in which it is emitted. Lenses, prisms, and mirrors are all exemplary optical elements.

In FIG. 1, two exemplary optical elements are present within the cavity 128 of the enclosure 120. Specifically, a lens 150 and a mirror 152 are positioned in an optical pathway 154 of the light emitted by the projector 140. Projection boundaries 156 are also shown in FIG. 1, depicting the gradually widening pathway along which the light is projected by the projector 140 until it reaches the interior surface 124 of the exterior wall 122.

The lens 150 may shorten the focal depth at which light is projected by the projector 140, so that the projector 140 and lens 150 provide "short-throw" projection, i.e., projection focused at a relatively short distance from the projector 140. The interior surface 124 on which the light is ultimately projected may be concave and/or uneven (for example, with vertical ridges that define the pumpkin shape), in which case the lens 150 may optionally be custom-designed for projection onto the interior surface 124 to modify the projection image projected by the projector 140 to take into account the shape of the interior surface 124 and/or the exterior surface 126 of the exterior wall 122. The lens 150 may be positioned adjacent to the projector 140, as shown, or may be positioned near the mirror 152 or near the interior surface 124 onto which the imagery is to be projected.

The mirror 152 may reflect the optical pathway 154 such that the imagery is projected against the interior surface 124 of the exterior wall 122 opposite that faced by the projector 140. The mirror 152 may thus lengthen the optical pathway 154 so that the projector 140 can project a relatively larger image on the interior surface 124. In FIG. 1, the mirror 152 is shown reflecting the light upward; however, in alternative embodiments, a mirror may be positioned to reflect light downward or to the side. The location of the projector 140 may be modified accordingly. In any case, it may be desirable for any opaque components residing within the cavity 128 (such as the projector 140, the speaker 142, and the storage device 144) to be outside the optical pathway 154, and outside the projection boundaries 156, as shown in FIG. 1, so as to avoid encroaching on the imagery to be projected.

Notably, the lens 150 and the mirror 152 are both optional. In some embodiments, the lens 150, the mirror 152, or both may be omitted. The projector 140 may be designed to operate with the lens 150 and without the mirror 152, or with the mirror 152 and without the lens 150. In the alternative, the projector 140 may be designed to operate without the lens 150 and the mirror 152, and may instead project light directly at the interior surface 124 interior to the exterior surface 126 on which the imagery is to be viewed, with no intervening optical element.

In some embodiments, all components used to provide the experience may be housed within the cavity 128 of the enclosure 120. For example, in some embodiments, only the projector 140, the speaker 142, the storage device 144, the lens 150, and the mirror 152 may be used. As mentioned previously, the speaker 142, the storage device 144, the lens 150, and the mirror 152 are optional. The functionality of one or more of these components may be incorporated into the projector 140. In other embodiments, it may be desirable to include other components to provide additional functionality.

For example, in some embodiments, the system 100 may also include a computing device 160, a remote control 162, and/or a sensor 164. The computing device 160 may facilitate control of the projector 140 and/or customization of the imagery to be projected. The remote control 162 may be used to remotely (i.e., from outside the cavity 128 of the enclosure 120) control the projector 140. The sensor 164 may be used to detect a condition, and enable the projector 140 to project imagery in response to the condition detected. One or more of the computing device 160, the remote control 162, and the sensor 164 may send data to or receive data from a network 166 such as a local area network (LAN) or the Internet.

The computing device 160 may be any type of device that processes and transmits information. In some embodiments, the computing device 160 may be a smartphone, tablet, or the like. The computing device 160 may have one or more sensors 180, a processor 182, memory 184, communications hardware 186, and/or other electronics that enable the computing device 160 to control one or more aspects of the operation of the projector 140. The computing device 160 may also have an input device 188 and an output device 190 designed to receive input from and provide output, respectively, to a user. In some embodiments, the input device 188 and the output device 190 may be integrated, for example, in the form of a touch screen. The sensors 180, the processor 182, the memory 184, the communications hardware 186, the input device 188, and the output device 190 may each be of any type known in the art.

The computing device 160 may be designed to run an application ("app") that assists in projection of the imagery. The app may be stored, for example, in the memory 184 as instructions 192 that are executable by the processor 182 of the computing device 160. The app may perform various functions, which may include, but are not limited to:

turning the projector 140 on or off;

changing settings of the projector 140;

generating image data 194, which may be transmitted to the projector 140 and projected as a static image on the exterior surface 126;

generating animated image data 196, which may be transmitted to the projector 140 and projected as an animated image on the exterior surface 126;

generating audio data 197, which may be transmitted to the projector 140 and/or the speaker 142 and emitted as audio;

receiving sensor data 198 from the sensors 180 and/or the sensor 164;

receiving user input 199 from the input device 188 and/or the remote control 162;

communicating with the network 166 to share or receive image data 194 and/or animated image data 196; and providing output to a user, for example, via the output device 190.

If desired, the app may have tools that can be used to custom-generate the image data 194 and/or the animated image data 196. Additionally or alternatively, the app may receive audio, image and/or video files of any known format (such as MP3, JPG, and MPG formats, and the like), which may be generated by other apps or obtained from other sources such as from the network 166.

The app may have tools that operate the projector 140 according to user-defined conditions. For example, the app may activate the projector 140 at a certain time of day, and deactivate the projector 140 at another certain time of day. As another example, the app may cause the projector 140 to project image data 194 until the sensor 164 and/or the sensors 180 detect the presence of the user 110 in close proximity to the enclosure 120, at which point the app may cause the projector 140 to instead display the animated image data 196 on the exterior surface 126 of the enclosure 120.

These are merely examples; those of skill in the art will recognize that many other conditional operations may be executed by the app. In other examples, the projector 140 may be controlled based on speech detected from the user 110, gestures made by the user 110, and/or other factors. The app executed by the computing device 160 may have artificial intelligence that enables the app to generate and apply a response that may not be predictable to the user 110. If desired, the image data 194 and/or the animated image data 196 transmitted to the projector 140 may be selected from a library of existing images and/or animations based on the operation of such artificial intelligence functionality.

Further, the app may have functionality apart from that specifically described herein. Notably, some of the functions of the app described above may be performed, additionally or alternatively, by the remote control 162 and/or the sensor 164. For example, the remote control 162 may be used to receive the user input 199. The remote control 162 may convey the user input 199 to the computing device 160, or may transmit signals directly to the projector 140 to control the operation of the projector 140 based on the user input 199. Further, the sensor 164 may be used to generate the sensor data 198, which may be transmitted to the computing device 160, or may be used to directly control operation of the projector 140 via a connection between the sensor 164 and the projector 140.

As mentioned previously, the computing device 160, the remote control 162, and the sensor 164 are optional; in some embodiments, one or more of these components may be omitted. Some or all of the functionality of omitted components may be incorporated into the projector 140.

The projector 140, the speaker 142, the storage device 144, the computing device 160, the remote control 162, and/or the sensor 164 may be connected together in any manner known in the art. In some embodiments, components may be connected together by wires 170. In the exemplary embodiment of FIG. 1, wires 170 connect the projector 140 to the speaker 142 and the storage device 144. Additionally or alternatively, components may be wirelessly connected together through the use of Wi-Fi, cellular networks, and/or any other known form of wireless communication. In the exemplary embodiment of FIG. 1, the computing device 160, the remote control 162, and the sensor 164 are connected to each other and to the projector 140 via signals 172 that are conveyed wirelessly between the computing device 160, the remote control 162, the sensor 164, and the projector 140.

Projection of Images and Animated Images

Figure 2A:
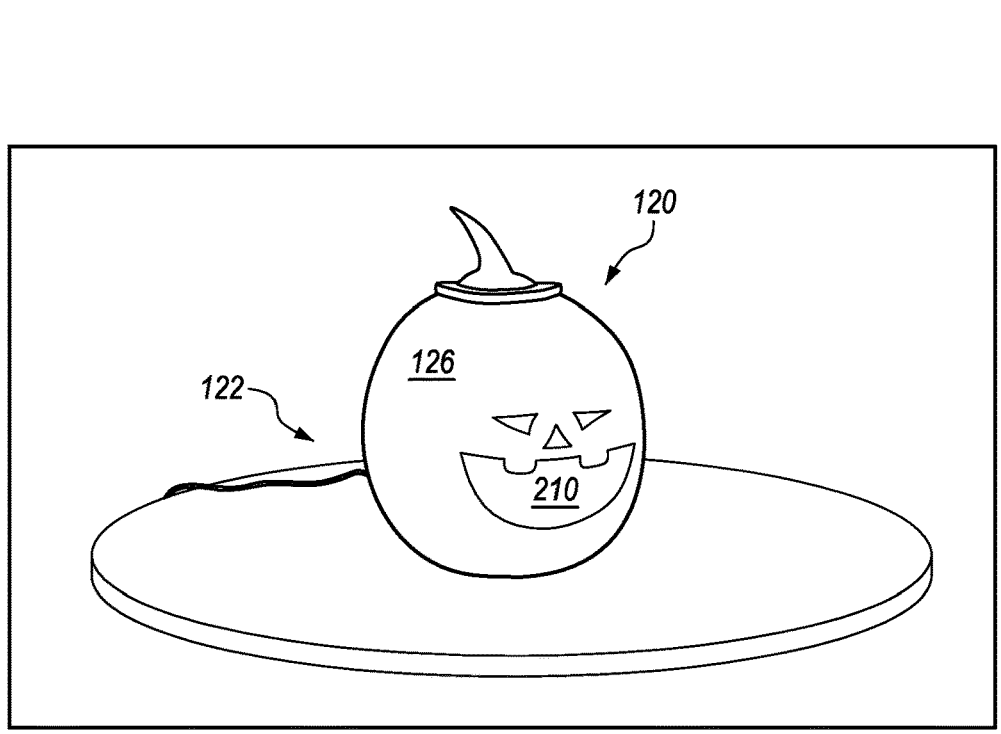
FIGS. 2A and 2B are pictures depicting an enclosure with an image and an animated image projected thereon, respectively, according to one embodiment.
Figure 2B:
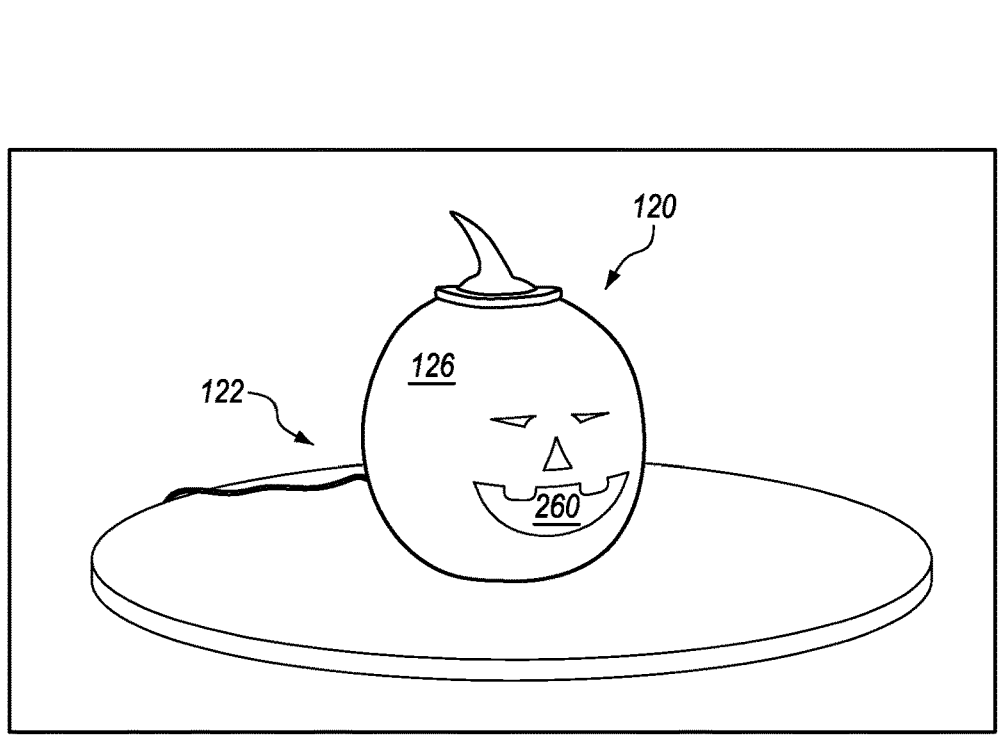

Referring to FIGS. 2A and 2B, pictures 200 and 250, respectively, depict an enclosure 120, as in FIG. 1, with an image 210 and an animated image 260 projected thereon, respectively, according to one embodiment. As shown in FIG. 2A, the image 210 may be visible on the exterior surface 126 of the exterior wall 122 by a user 110.

According to one mode of operation, the image 210 may be displayed on the exterior surface 126 until the detection of a condition, such as proximity of the user 110 to the enclosure 120. When the condition is detected, the image 210 may be replaced with the animated image 260 of FIG. 2B, in which the pumpkin appears to talk to the user 110. Of course, this is only one exemplary mode of operation of the system 100. Further, the enclosure 120 is exemplary and many different enclosures may be used, as described previously.

Exemplary Projection Method

Figure 3:
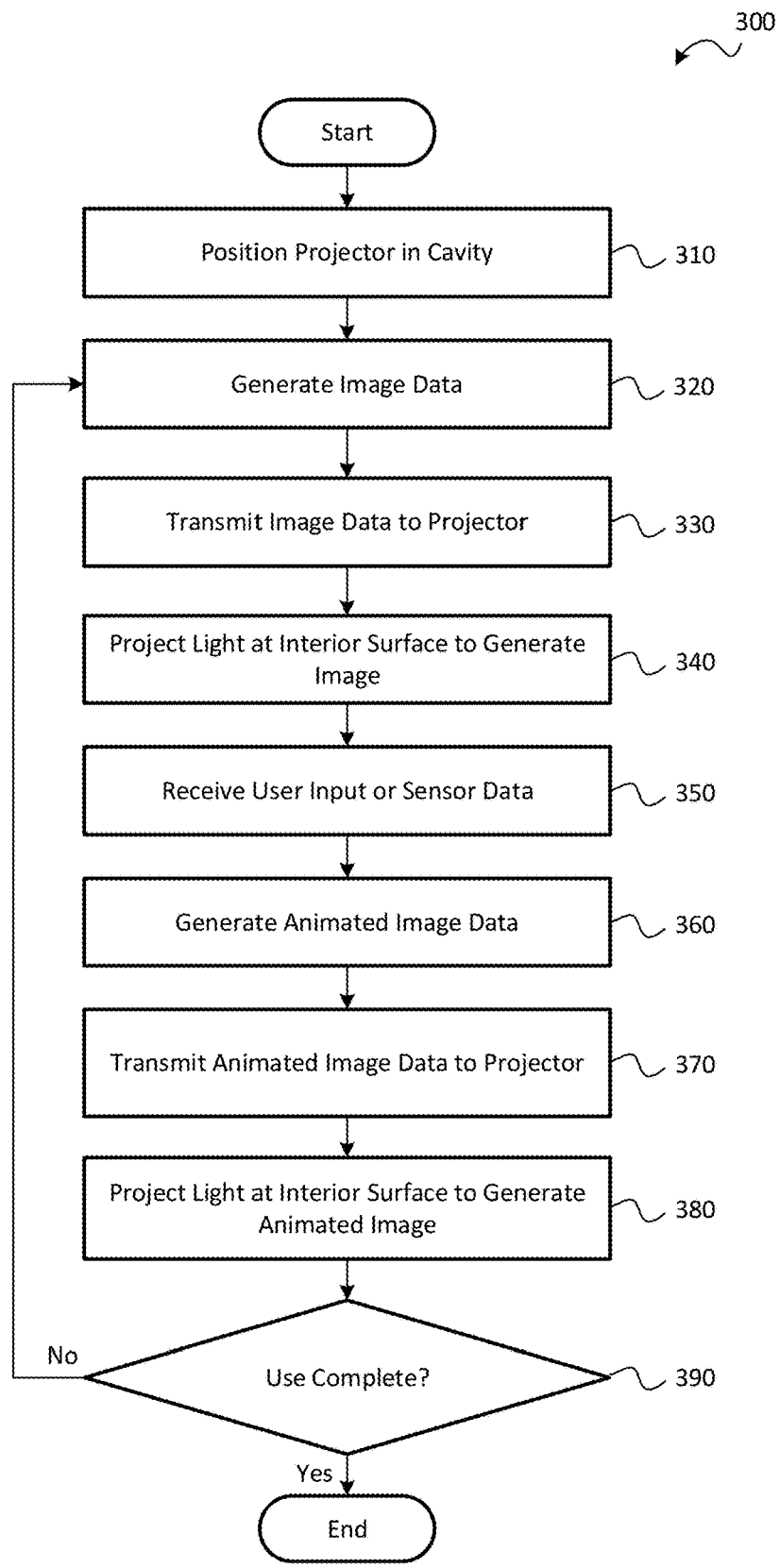
FIG. 3 is a flowchart diagram of a method of projecting imagery onto an object according to one embodiment.

Referring to FIG. 3, a flowchart diagram illustrates a method 300 of projecting imagery onto an object according to one embodiment. The method 300 will be described in connection with the system 100 of FIG. 1. However, the method 300 is not limited to the system 100 of FIG. 1, but may instead be used in connection with other systems according to various alternative embodiments. Further, the system 100 of FIG. 1 may be used in conjunction with methods different from the method 300 of FIG. 3.

The method 300 may start with a step 310 in which the projector 140 is positioned in the cavity 128 of the enclosure 120. If the projector support 148 is formed as a separate piece from the exterior wall 122, the projector support 148 may first be inserted into the cavity 128 and secured in place. Then, the projector 140 may be placed on and/or secured to the projector support 148.

In a step 320, the image data 194 may be generated and/or obtained. As mentioned previously, the image data 194 may be generated by the device 160, obtained from the network 166, and/or stored on the storage medium 146.

In a step 330, the image data 194 may be transmitted to the projector 140. The image data 194 may be transmitted via a wired connection (for example, via the wires 170), or wirelessly (for example, via the signals 172).

In a step 340, light may be projected at the interior surface 124 of the exterior wall 122 with the projector 140 to generate the image 210 on the exterior surface 126 of the exterior wall 122. The projection image projected to the interior surface 124 may be based on the image data 194. If desired, the projector 140 may apply various transformations to the image data 194, such as flipping the image data 194 backward, prior to emission of the projection image. The projection image may pass through or reflect from one or more optical elements, such as the lens 150 and the mirror 152, prior to reaching the interior surface 124 of the exterior wall 122 of the enclosure 120.

In a step 350, sensor data 198 and/or user input 199 may be received, for example, in the computing device 160. The sensor data 198 and/or the user input 199 may indicate that the user 110 is present, or that the user 110 wishes to modify the operation of the projector 140. The computing device 160 may determine that a condition has been met.

In a step 360, animated image data 196 may be generated and/or obtained. As mentioned previously, the animated image data 196 may be generated by the device 160, obtained from the network 166, and/or stored on the storage medium 146.

In a step 370, the animated image data 196 may be transmitted to the projector 140. The animated image data 196 may be transmitted via a wired connection (for example, via the wires 170), or wirelessly (for example, via the signals 172).

In a step 380, light may be projected at the interior surface 124 of the exterior wall 122 with the projector 140 to generate the animated image 260 on the exterior surface 126 of the exterior wall 122. The animated projection image projected onto the interior surface 124 may be based on the animated image data 196. If desired, the projector 140 may apply various transformations to the animated image data 196, such as flipping the animated image data 196 backward, prior to emission of the animated projection image. The animated projection image may pass through or reflect from one or more optical elements, such as the lens 150 and the mirror 152, prior to reaching the interior surface 124 of the exterior wall 122 of the enclosure 120.

In a query 390, a determination may be made as to whether use of the system 100 is complete. If not, the method 300 may return to an earlier step, such as the step 320 of FIG. 3. For example, once the animated image 260 has been shown in its entirety, the system 100 may return to display of the image 210, or of another image. The step 320 may be carried out again, and the intervening steps (for example, the step 330, the step 340, the step 350, the step 360, the step 370, and the step 380) may be repeated until use of the system 100 is complete. Once the query 390 is answered in the affirmative, the method 300 may end.

The method 300 is merely exemplary. Various steps of the method 300 may be re-ordered, repeated, omitted, and/or replaced with alternative steps, as would be understood by a person of skill in the art with the aid of the present disclosure.

The above description and referenced drawings set forth particular details with respect to possible embodiments. Those of skill in the art will appreciate that the techniques described herein may be practiced in other embodiments. First, the particular naming of the components or capitalization of terms is not mandatory or significant, and the mechanisms that implement the techniques described herein may have different names, formats, or protocols. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

While a limited number of embodiments has been described herein, those skilled in the art, having benefit of the above description, will appreciate that other embodiments may be devised which do not depart from the scope of the claims. In addition, it should be noted that the language used in the specification has been principally selected for readability and instructional purposes, and may not have been selected to delineate or circumscribe the inventive subject matter. Accordingly, the disclosure is intended to be illustrative, but not limiting.

What is claimed is:

1. A system comprising:
   a portable, self-contained, generally spherical enclosure comprising an exterior wall defining a cavity therein, the exterior wall comprising an interior surface and an exterior surface, wherein the entirety of the exterior wall defines a decorative shape, the decorative shape having at least one physical feature;
   a mirror, contained entirely within the generally spherical enclosure and situated along a back portion of the interior surface;
   a projector, contained entirely within the generally spherical enclosure and configured to project an animated image that, in combination with the decorative shape of the enclosure, causes the at least one physical feature of the decorative shape to appear to be moving, when viewed from the exterior of the generally spherical enclosure; and
   a projector support contained entirely within the generally spherical enclosure;
   wherein:
   the decorative shape resembles a pumpkin that is not attached to a body;
   the mirror, projector, and projector support are positioned so that the projector support supports the projector in a position and orientation within the cavity in which the animated image is projected rearwardly onto the mirror and then reflected toward the front portion of the interior surface from within the cavity; and
   the exterior wall has a thickness and material composition selected such that, in response to projection of the animated image onto the front portion of the interior surface, the animated image is visible on the exterior surface.

2. The system of claim 1, further comprising a remote control configured to control operation of the projector by transmitting signals to the projector through the exterior wall.

3. The system of claim 1, further comprising a sensor configured to detect at least one condition selected from the group consisting of presence of a user, motion of the user, and sound made by the user;
   wherein the sensor is operatively connectable to the projector to activate, deactivate, and/or modify display of the animated image on the exterior surface in response to detection of the condition.

4. The system of claim 1, further comprising a computing device operatively connectable to the projector to control display of the animated image on the exterior surface.

5. The system of claim 1, further comprising an audio output device configured to output an audio track, wherein the animated image is projected in synchronization with the audio track.

6. The system of claim 1, further comprising a non-transitory computer-readable medium comprising computer code stored thereon, that when executed by a processor of a computing device operatively connected to the projector, controls display of the animated image on the exterior surface.

7. The system of claim 6, wherein the computer code is further configured, when executed by a processor, to control display of the animated image by:
   generating animated image data; and
   initiating transmission of the animated image data to the projector.

8. The system of claim 6, wherein the computer code is further configured, when executed by a processor, to control display of the animated image by:
   causing an input device to receive user input from a user;
   in response to receipt of the user input, generating the animated image data; and
   initiating transmission of the animated image data to the projector to cause the projector to display the animated image.

9. The system of claim 6, wherein the computer code is further configured, when executed by a processor, to control display of the animated image by:
   causing a sensor to generate sensor data based on detection at least one condition selected from the group consisting of presence of a user, motion of the user, and sound made by the user;
   in response to receipt of the sensor data, generating the animated image data; and
   initiating transmission of the animated image data to the projector to cause the projector to display the animated image.

10. The system of claim 6, wherein the computer code is further configured, when executed by a processor, to:
    generate audio data representing an audio track; and
    initiate transmission of the audio data to an audio output device configured to output the audio track, wherein the animated image is projected in synchronization with the audio track.

11. The system of claim 1, wherein:
    the at least one physical feature comprises a representation of a mouth;
    the projected animated image comprises a representation of an animated mouth that causes the physical feature to appear to be vocalizing.

12. The system of claim 1, wherein the projector is configured to project the animated image in a manner that takes into account the at least one physical feature of the decorative shape.

13. The system of claim 1, wherein the generally spherical enclosure is unattached to any other component other than a power source.

14. A method for generating an animated image on an exterior surface of an exterior wall of a portable, self-contained, generally spherical enclosure, wherein the entirety of the exterior wall defines a decorative shape, the decorative shape having at least one physical feature, the exterior surface defining a cavity therein, the exterior wall comprising an interior surface and an exterior surface, the method comprising:

positioning a mirror within the cavity so that the mirror is contained entirely within the generally spherical enclosure and situated along a back portion of the interior surface;

positioning a projector on a projector support within the cavity so that the projector and projector support are contained entirely within the generally spherical enclosure in a position and orientation in which the animated image is projected rearwardly onto the mirror and then reflected toward the front portion of the interior surface from within the cavity; and with the projector positioned within the cavity, projecting the animated image rearwardly onto the mirror so that it is reflected toward the front portion of the interior surface such that the projected animated image is visible on the exterior surface, wherein the animated image, in combination with the decorative shape of the enclosure, causes the at least one physical feature of the decorative shape to appear to be moving, when viewed from the exterior of the generally spherical enclosure;

wherein:

the decorative shape resembles a pumpkin that is not attached to a body.

15. The method of claim 14, further comprising:

generating animated image data; and initiating transmission of the animated image data to the projector;

wherein projecting the animated image comprises projecting an animated projection image based on the animated image data.

16. The method of claim 15, further comprising:

at an input device or a sensor, receiving an element selected from the group consisting of user input and sensor data;

in response to receipt of the element, generating the animated image data;

initiating transmission of the animated image data to the projector; and projecting the animated projection image, based on the animated image data, such that, in response to projection of the animated projection image, the animated image is visible on the exterior surface.

17. The method of claim 14, wherein:

the at least one physical feature comprises a representation of a mouth;

the projected animated image comprises a representation of an animated mouth that causes the physical feature to appear to be vocalizing.

18. The method of claim 14, wherein projecting the animated image comprises projecting the animated image in a manner that takes into account the at least one physical feature of the decorative shape.

19. The method of claim 14, wherein the animated image is projected in synchronization with an audio track being output on an audio output device.

20. The method of claim 14, wherein the generally spherical enclosure is unattached to any other component other than a power source.

21. A portable, self-contained, generally spherical enclosure comprising:

an exterior wall, wherein the entirety of the exterior wall defines a decorative shape of the portable, self-contained, generally spherical enclosure and further defines a cavity therein, the exterior wall comprising an interior surface and an exterior surface, the decorative shape having at least one physical feature;

a mirror, contained entirely within the portable, self-contained, generally spherical enclosure and situated along a back portion of the interior surface; and a projector support positioned within the cavity and contained entirely within the portable, self-contained, generally spherical enclosure; and a projector, supported by the projector support within the cavity and contained entirely within the portable, self-contained, generally spherical enclosure, the projector being configured to project an animated image that, in combination with the decorative shape of the enclosure, causes the at least one physical feature of the decorative shape to appear to be moving, when viewed from the exterior of the generally spherical enclosure;

wherein:

the decorative shape resembles a pumpkin that is not attached to a body;

the mirror, projector support, and projector are positioned so that the projector support supports the projector in a position and orientation within the cavity in which the animated image is projected rearwardly onto the mirror and then reflected toward the front portion of the interior surface from within the cavity; and the exterior wall has a thickness and material composition selected such that, in response to projection of the animated image rearwardly onto the mirror and then reflected toward the front portion of the interior surface, the animated image is visible on the exterior surface.

22. The enclosure of claim 21, wherein:

the at least one physical feature comprises a representation of a mouth;

the projected animated image comprises a representation of an animated mouth that causes the physical feature to appear to be vocalizing.

23. The enclosure of claim 21, wherein the projector is configured to project the animated image in a manner that takes into account the at least one physical feature of the decorative shape.

24. The enclosure of claim 21, wherein the animated image is projected in synchronization with an audio track being output on an audio output device.

25. The enclosure of claim 21, wherein the generally spherical enclosure is unattached to any other component other than a power source.

26. A system comprising:

a portable, self-contained, generally spherical enclosure comprising an exterior wall defining a cavity therein, the exterior wall comprising an interior surface and an exterior surface, wherein the entirety of the exterior wall defines a decorative shape, the decorative shape having at least one physical feature;

a wireless communication device, contained entirely within the generally spherical enclosure, configured to receive a signal representing an animated image via a wireless communication medium;

a mirror, contained entirely within the generally spherical enclosure and situated along a back portion of the interior surface;

a projector, contained entirely within the generally spherical enclosure, connected to the wireless communication device, and configured to project the animated image represented by the received signal so that, in combination with the decorative shape of the enclosure, the animated image causes the at least one physical feature of the decorative shape to appear to be moving, when viewed from the exterior of the generally spherical enclosure; and a projector support;

wherein:

the decorative shape resembles a pumpkin that is not attached to a body;

the mirror, projector, and projector support are positioned so that the projector support supports the projector in a position and orientation within the cavity in which the animated image is projected rearwardly onto the mirror and then reflected toward the front portion of the interior surface from within the cavity; and the exterior wall has a thickness and material composition selected such that, in response to projection of the animated image onto the front portion of the interior surface, the animated image is visible on the exterior surface.

27. The system of claim 26, further comprising a remote control configured to control operation of the projector by transmitting signals to the wireless communication device through the exterior wall.

28. The system of claim 26, further comprising a sensor configured to detect at least one condition selected from the group consisting of presence of a user, motion of the user, and sound made by the user;

wherein the sensor is operatively connectable to the wireless communication device to activate, deactivate, and/or modify display of the animated image on the exterior surface in response to detection of the condition.

29. The system of claim 26, further comprising an audio output device configured to output an audio track, wherein the animated image is projected in synchronization with the audio track.

30. The system of claim 26, further comprising a non-transitory computer-readable medium comprising computer code stored thereon, that when executed by a processor of a computing device operatively connected to the wireless communication device, controls display of the animated image on the exterior surface.

31. The system of claim 30, wherein the computer code is further configured, when executed by a processor, to control display of the animated image by:

generating animated image data; and initiating transmission of the animated image data to at least one of the wireless communication device and the projector.

32. The system of claim 30, wherein the computer code is further configured, when executed by a processor, to control display of the animated image by:

causing a sensor to generate sensor data based on detection at least one condition selected from the group consisting of presence of a user, motion of the user, and sound made by the user;

in response to receipt of the sensor data, generating the animated image data; and initiating transmission of the animated image data to at least one of the wireless communication device and the projector, to cause the projector to display the animated image.

33. The system of claim 26, wherein:

the at least one physical feature comprises a representation of a mouth;

the projected animated image comprises a representation of an animated mouth that causes the physical feature to appear to be vocalizing.

34. The system of claim 26, wherein the projector is configured to project the animated image in a manner that takes into account the at least one physical feature of the decorative shape.

35. The system of claim 26, further comprising an audio output device, configured to output an audio track, and wherein the animated image is projected in synchronization with the audio track.

36. The system of claim 26, wherein the generally spherical enclosure is unattached to any other component other than a power source.

37. A method for generating an animated image on an exterior surface of an exterior wall of a portable, self-contained, generally spherical enclosure, wherein the entirety of the exterior wall defines a decorative shape, the decorative shape having at least one physical feature, the exterior surface defining a cavity therein, the exterior wall comprising an interior surface and an exterior surface, the method comprising:

positioning a mirror within the cavity so that the mirror is contained entirely within the generally spherical enclosure and situated along a back portion of the interior surface;

positioning a projector on a projector support within the cavity so that the projector and projector support are contained entirely within the generally spherical enclosure in a position and orientation in which the animated image is projected rearwardly onto the mirror and then reflected toward the front portion of the interior surface from within the cavity;

transmitting, via a wireless communication medium, a signal representing an animated image to a wireless communication device coupled to the projector and contained entirely within the generally spherical enclosure;

with the projector positioned within the cavity, projecting the animated image represented by the signal rearwardly onto the mirror so that it is reflected toward the front portion of the interior surface such that the projected animated image is visible on the exterior surface, wherein the animated image, in combination with the decorative shape of the enclosure, causes the at least one physical feature of the decorative shape to appear to be moving, when viewed from the exterior of the generally spherical enclosure;

wherein:

the decorative shape resembles a pumpkin that is not attached to a body.

38. The method of claim 37, further comprising:

at an input device or a sensor, receiving an element selected from the group consisting of user input and sensor data; and in response to receipt of the element, generating animated image data and initiating transmission of the signal representing the animated image to the projector; and projecting the animated projection image, based on the received signal, such that, in response to projection of the animated projection image, the animated image is visible on the exterior surface.

39. The method of claim 37, wherein:

the at least one physical feature comprises a representation of a mouth;

the projected animated image comprises a representation of an animated mouth that causes the physical feature to appear to be vocalizing.

40. The method of claim 37, wherein projecting the animated image comprises projecting the animated image in a manner that takes into account the at least one physical feature of the decorative shape.

41. The method of claim 37, wherein the projector projects the animated image in synchronization with an audio track being output on an audio output device.

42. The method of claim 37, wherein the generally spherical enclosure is unattached to any other component other than a power source.

43. A portable, self-contained, generally spherical enclosure comprising:
    an exterior wall defining a decorative shape of the portable, self-contained, generally spherical enclosure and further defining a cavity therein, the exterior wall comprising an interior surface and an exterior surface, the decorative shape having at least one physical feature;
    a mirror, contained entirely within the portable, self-contained, generally spherical enclosure and situated along a back portion of the interior surface;
    a wireless communication device, positioned within the cavity, configured to receive a signal representing an animated image via a wireless communication medium; and
    a projector support positioned within the cavity and contained entirely within the portable, self-contained, generally spherical enclosure; and
    a projector, supported by the projector support within the cavity and contained entirely within the portable, self-contained, generally spherical enclosure, the projector being configured to project the animated image represented by the received signal rearwardly onto the mirror so that it is reflected toward the front portion of the interior surface;
    wherein:
    the decorative shape resembles a pumpkin that is not attached to a body;
    the projector is connected to the wireless communication device;
    the exterior wall has a thickness and material composition selected such that, in response to projection of the animated image rearwardly onto the mirror and then reflected toward the front portion of the interior surface, the animated image is visible on the exterior surface; and
    the projected animated image visible on the exterior surface, in combination with the decorative shape of the enclosure, causes the at least one physical feature of the decorative shape to appear to be moving, when viewed from the exterior of the generally spherical enclosure.

44. The enclosure of claim 43, wherein:
    the at least one physical feature comprises a representation of a mouth;
    the projected animated image comprises a representation of an animated mouth that causes the physical feature to appear to be vocalizing.

45. The enclosure of claim 43, wherein the projector is configured to project the animated image in a manner that takes into account the at least one physical feature of the decorative shape.

46. The enclosure of claim 43, wherein the projector projects the animated image in synchronization with an audio track being output on an audio output device.

47. The enclosure of claim 43, wherein the generally spherical enclosure is unattached to any other component other than a power source.

* * * * *